(12) United States Patent
Yuen et al.

(10) Patent No.: US 10,979,479 B2
(45) Date of Patent: Apr. 13, 2021

(54) WIRELESS MULTIMEDIA COMMUNICATIONS SYSTEM AND METHOD

(71) Applicant: PERASO TECHNOLOGIES INC., Toronto (CA)

(72) Inventors: Derek Yuen, Richmond Hill (CA); Bradley Robert Lynch, Toronto (CA)

(73) Assignee: PERASO TECHNOLOGIES INC., Toronto (CA)

(*) Notice: Subject to any disclaimer, the term of this patent is extended or adjusted under 35 U.S.C. 154(b) by 75 days.

(21) Appl. No.: 15/659,043

(22) Filed: Jul. 25, 2017

(65) Prior Publication Data

US 2018/0027044 A1  Jan. 25, 2018

Related U.S. Application Data

(60) Provisional application No. 62/366,279, filed on Jul. 25, 2016, provisional application No. 62/366,317, filed on Jul. 25, 2016.

(51) Int. Cl.
*H04L 12/00* (2006.01)
*H04L 29/06* (2006.01)
*G06F 3/147* (2006.01)

(52) U.S. Cl.
CPC ............. *H04L 65/80* (2013.01); *G06F 3/147* (2013.01); *H04L 65/4092* (2013.01); *H04L 65/60* (2013.01); *G09G 2350/00* (2013.01); *G09G 2370/04* (2013.01); *G09G 2370/16* (2013.01)

(58) Field of Classification Search
CPC ... H04W 56/00; H04W 52/282; H04W 24/08; H04B 1/175; H04B 17/364; G06F 1/3203

USPC .......................... 709/217; 370/509; 340/3.3
See application file for complete search history.

(56) References Cited

U.S. PATENT DOCUMENTS

| | | | | |
|---|---|---|---|---|
| 5,613,217 A * | 3/1997 | Hagstrom | ............. | H04W 16/18 455/440 |
| 6,047,175 A * | 4/2000 | Trompower | .......... | H04W 88/02 455/434 |
| 6,167,238 A * | 12/2000 | Wright | ............... | H04W 52/282 340/3.3 |
| 6,216,002 B1 * | 4/2001 | Holmring | ............. | H04W 64/00 379/118 |
| 6,748,212 B2 * | 6/2004 | Schmutz | ............. | H04B 7/2606 455/16 |
| 7,027,418 B2 * | 4/2006 | Gan | ....................... | H04B 1/715 |
| 7,218,670 B1 * | 5/2007 | Lesea | ................... | H04B 17/364 370/509 |
| 7,221,668 B2 * | 5/2007 | Twitchell, Jr. | ......... | G06Q 10/06 370/338 |

(Continued)

*Primary Examiner* — Frantz Coby
(74) *Attorney, Agent, or Firm* — Perry + Currier

(57) ABSTRACT

A system is provided comprising: a host computing device including: a wireless transceiver; and a processor configured to generate multimedia data for transmission via the wireless transceiver; and a movably-mounted client device including: a first set of wireless transceivers; a controller connected to the output assembly and each of the wireless transceivers; the controller configured to: assess respective performance attributes for each of the first set of transceivers; and based on the performance attributes, select a transceiver from the first set to receive the multimedia data from the host computing device; and an output assembly for presenting the multimedia data.

13 Claims, 7 Drawing Sheets

(56) References Cited

U.S. PATENT DOCUMENTS

| | | | |
|---|---|---|---|
| 8,373,576 B2* | 2/2013 | Strohm | H04Q 9/00 340/539.1 |
| 9,432,865 B1* | 8/2016 | Jadunandan | H04W 24/08 |
| 9,521,635 B1* | 12/2016 | Lambert | H04W 40/244 |
| 9,727,115 B1* | 8/2017 | Brown | G06F 1/3203 |
| 2001/0034475 A1* | 10/2001 | Flach | A61B 5/0006 600/300 |
| 2005/0062637 A1* | 3/2005 | El Zabadani | A61B 5/0062 341/176 |
| 2006/0224730 A1* | 10/2006 | Fok | H04W 24/00 709/224 |
| 2008/0031205 A1* | 2/2008 | Kahola | H04L 12/413 370/338 |
| 2011/0161044 A1* | 6/2011 | Gonia | G08B 21/14 702/150 |
| 2011/0249576 A1* | 10/2011 | Chrisikos | H01Q 1/243 370/252 |
| 2011/0286437 A1* | 11/2011 | Austin | H04W 88/06 370/338 |
| 2012/0149311 A1* | 6/2012 | Takata | H04W 72/02 455/67.11 |
| 2012/0243412 A1* | 9/2012 | Voruganti | H04L 47/30 370/235 |
| 2012/0294268 A1* | 11/2012 | Lee | H04L 1/0057 370/329 |
| 2014/0140224 A1* | 5/2014 | Hakansson | H04B 7/0608 370/252 |
| 2015/0030091 A1* | 1/2015 | El-Najjar | H04B 7/0877 375/267 |
| 2015/0341211 A1* | 11/2015 | Saha | H04L 41/0823 709/221 |
| 2016/0050680 A1* | 2/2016 | Simonsson | H04B 7/0689 370/329 |
| 2016/0164580 A1* | 6/2016 | El-Najjar | H04B 7/0413 375/267 |
| 2016/0262056 A1* | 9/2016 | Chen | H04W 28/20 |
| 2016/0358189 A1* | 12/2016 | Furry | G06Q 30/0201 |
| 2017/0303138 A1* | 10/2017 | Barmettler | H04W 16/18 |

* cited by examiner

WIRELESS MULTIMEDIA COMMUNICATIONS SYSTEM AND METHOD

CROSS-REFERENCE TO RELATED APPLICATIONS

This application claims priority from U.S. provisional patent application Nos. 62/366,279 and 62/366,317, both filed Jul. 25, 2016. The contents of each of the above applications is incorporated herein by reference.

FIELD

The specification relates generally to wireless communications, and specifically to a wireless multimedia communications system with mobile client devices served by a stationary host device.

BACKGROUND

Media streaming systems, such as virtual reality systems in which a user wears a headset or other device displaying video, may rely on a distinct host device such as a game console to generate the video and stream the video to the headset. In order to provide the bandwidth required to carry the above-mentioned vide, such systems may compromise the mobility of the headset. Alternatively, or in addition, such systems may reduce the available bandwidth in order to provide greater mobility to the headset.

SUMMARY

According to an aspect of the specification, a system is provided comprising: a host computing device including: a wireless transceiver; and a processor configured to generate multimedia data for transmission via the wireless transceiver; and a movably-mounted client device including: a first set of wireless transceivers; a controller connected to the output assembly and each of the wireless transceivers; the controller configured to: assess respective performance attributes for each of the first set of transceivers; and based on the performance attributes, select a transceiver from the first set to receive the multimedia data from the host computing device; and an output assembly for presenting the multimedia data.

BRIEF DESCRIPTIONS OF THE DRAWINGS

Embodiments are described with reference to the following figures, in which.

DETAILED DESCRIPTION

Figure 1:
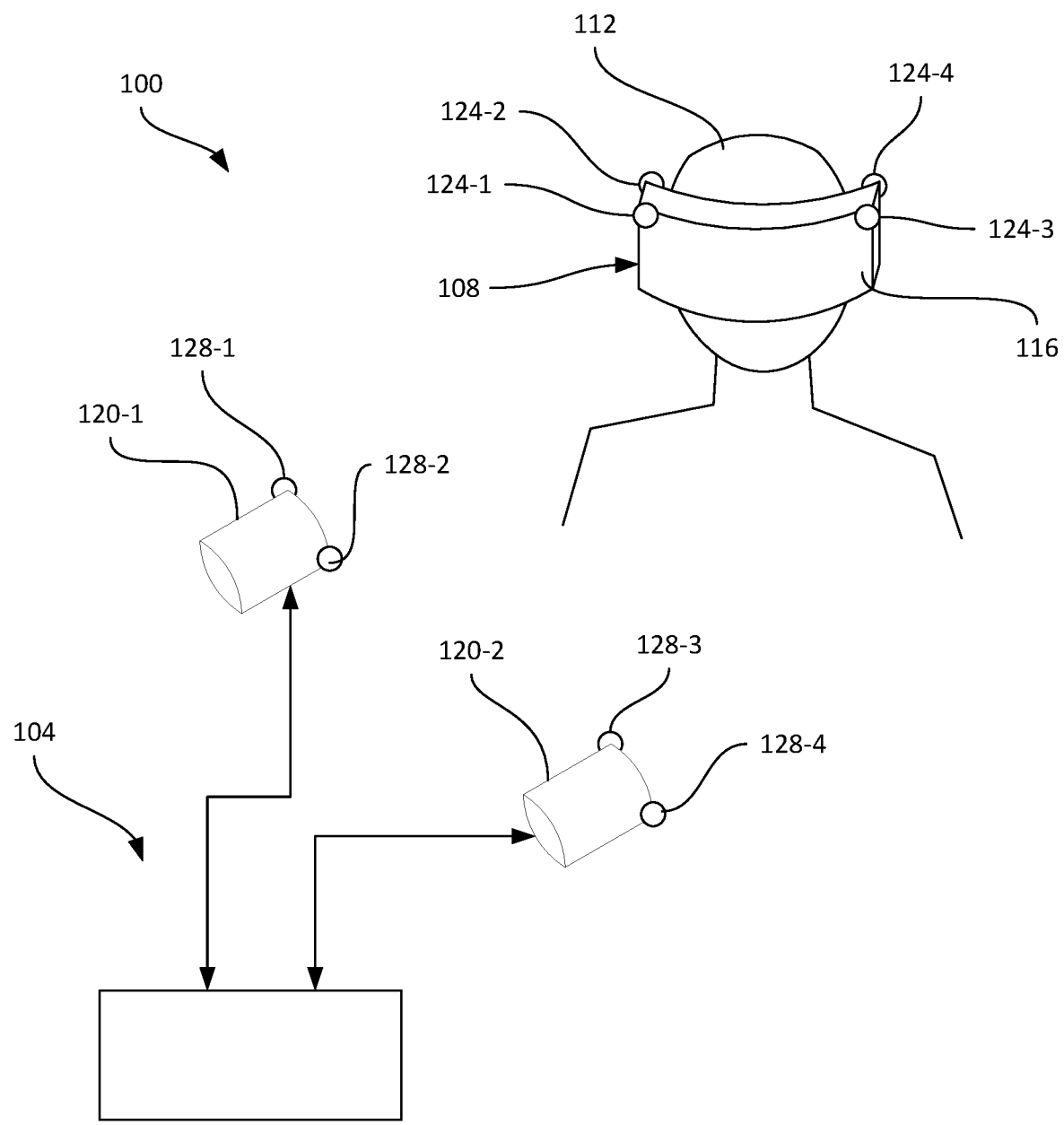
FIG. 1 depicts a wireless multimedia communications system.

FIG. 1 depicts a wireless multimedia communication system 100 including a host computing device 104 and a client computing device 108. The client computing device 108 is movably mounted. In the present example, the client computing device includes a head-mounted unit supported by a headband or other mount that is wearable by an operator 112. In other words, the client device 108 is moveably mounted as a result of being mounted on the operator 112, who is free to move relative to the host device 104. The client device 108, in general, receives multimedia data from the host device 104 and presents the multimedia data to the operator 112 via output devices such as a display, one or more speakers, and the like.

The host device 104 is typically, although not necessarily, stationary. The host device 104, as will be discussed in greater detail below, generates multimedia data for wireless transmission to the client device 108 (and presentation to the operator 112). The nature of the multimedia data is not particularly limited; for example, the multimedia data can include static video and audio, in addition to or instead of dynamically generated video and audio data, also referred to as virtual reality multimedia data. The host device 104 can therefore be implemented as any suitable computing device, including a desktop computer, laptop computer, gaming console, and the like.

In the present example, the client device 108 is a virtual reality (VR) headset. The client device 108 thus includes a housing 116 supporting the other components of the client device 108, as discussed below. The housing 116, in turn, is supported on the operator 112 by way of a headband or other mounting structure. The client device 108 can be implemented as a dedicated VR headset, in which the components of the client device 108 are integrally supported within the housing 116. In other examples, the client device 108 is implemented as a holder for a smart phone or other portable computing device, which provides at least some of the above-mentioned output devices (e.g. the display) and may also provide certain data processing functions. The housing 116, in such examples, is configured to removably support such a portable computing device, and also to integrally support certain other components, such as wireless transceivers, to be discussed below. The housing 116, in such examples, also includes one or more connectors for electrically connecting the components internal to the housing 116 with the portable computing device.

The generation of VR multimedia data by the host device 104 for transmission to the client device 108 typically includes obtaining positional data for the client device. The host device 104 therefore includes, in the present example, at least one tracking device 120. In the illustrated example, the host device 104 includes a pair of tracking devices 120-1 and 120-2, such as depth cameras (e.g. including infrared (IR) projectors and IR cameras), configured to determine the position of the client device 108, the operator 112, or both, relative to the tracking devices 120. The host device 104 is configured to receive positional data from the tracking devices 120 (or to receive image or depth data from the tracking devices 120 and determine positional data) and to dynamically generate VR multimedia data based on the positional data. Typically, the positional data is updated periodically (e.g. at a rate of thirty times per second), and the generation of VR data is implemented with the most recently obtained positional data. Thus, each of a plurality of video frames and accompanying audio data generated by the host device 104, for example, may be generated based on a newly obtained position of the operator 112, client device 108, or both.

Having generated the VR data, the host device 104 is configured to transmit the VR data to the client device 108. More specifically, in the present example, in which the VR data is video data, the VR data is streamed to the client device 108 simultaneously with the generation of further VR data. The VR data is transmitted from the host device 104 to the client device 108 wirelessly. For example, the host device 104 and the client device 108 may establish a wireless connection with each other based on any suitable wireless standard, such as the IEEE 802.11ad (WiGig) standard or enhancements thereof (e.g. 802.11ay). To that end, each of the client device 108 and the host device 104 include at least one wireless transceiver.

In the illustrated example, the client device includes a plurality of wireless transceivers 124-1, 124-2, 124-3 and 124-4. The transceivers 124 are supported by the housing 116 and connected to internal processing components (not shown) of the client device 108 by any suitable set of electrical connections (e.g. data buses or the like, not shown). As seen in FIG. 1, the transceivers 124 are spaced apart from each other on the housing 116. For example, each transceiver 124 is placed at a different one of the upper corners of the housing 116. A wide variety of other spaced apart arrangements for the transceivers 124 are also contemplated. As will be apparent in the discussion below, the arrangement of the transceivers 124 on the housing 116 is selected to enable the exchange of wireless data between at least one of the transceivers 124 and the host device 104 at any given time, for any of a plurality of positions of the client device 108 relative to the host device 104. In some examples, the transceivers 124 are placed on the housing 116 such that at least one transceiver 124 has a line of sight to the host device 104 for any orientation of the client device 108.

The host device 104 in the present example also includes a plurality of transceivers 128-1, 128-2, 128-3 and 128-4. In other examples, each of the host device 104 and the client device 108 can include different numbers of transceivers 124 and 128, respectively, than shown in FIG. 1. Further, the client device 108 and the host device 104 need not include the same number of transceivers as one another.

In the example shown in FIG. 1, the transceivers 128 are placed on the tracking devices 120, which may in turn be supported on a stand, wall-mount or other mounting structure (not shown). Specifically, the transceivers 128-1 and 128-2 are supported by the tracking device 120-1, and the transceivers 128-3 and 128-4 are supported by the tracking device 120-2. In other examples, the transceivers 128 may be distributed differently amongst the tracking devices 120 (e.g. all transceivers 128 supported by the tracking device 120-2). In further examples, the transceivers 128 are not supported by the tracking devices 120, but are rather supported on a housing of the host device 104 or any other suitable support structure (e.g. a mast extending from the host device 104 housing and distinct from the support structure for the tracking devices 120).

As will be discussed in greater detail below, each of the host device 104 and the client device 108 are configured to control their respective transceivers 124 and 128 to enable the continued exchange of multimedia data between devices in response to changes in wireless link quality conditions. Such changes may be caused by the movement of the client device 108 relative to the host device 104, by the presence of one or more additional client devices (not shown), and the like. Before discussing the functionality of the host device 104 and the client device 108, certain internal components of the host device 104 and the client device 108 will be discussed with reference to FIG. 2.

Figure 2:
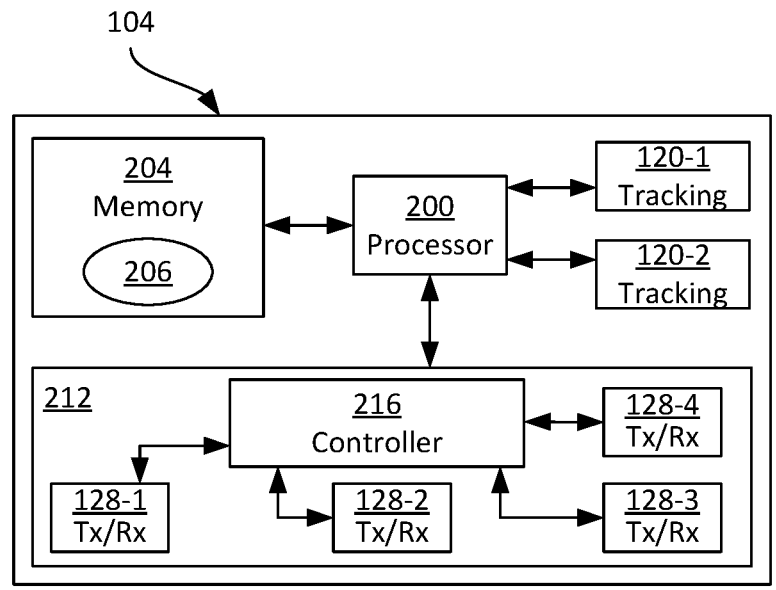
FIG. 2 depicts certain internal components of the client and host devices of the system of FIG. 1.
Figure 2:
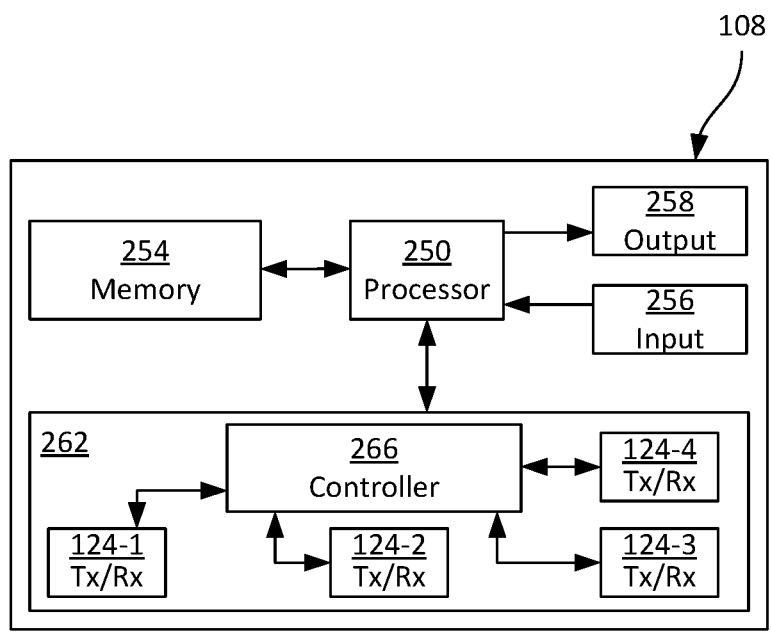

Turning to FIG. 2, certain components of each of the host device 104 and the client device 108 are illustrated. The host device 104 includes a central processing unit (CPU), also referred to as a processor 200. The processor 200 is interconnected with a non-transitory computer readable storage medium, such as a memory 204, having stored thereon various computer readable instructions in the form of an application 206 for execution by the processor 200 to configure the host device 104 to perform various functions (e.g. generating and streaming multimedia data to the client device 108). The memory 200 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The host device 104 may also include one or more input devices (e.g. a keyboard, mouse, game controller or the like, not shown), and one or more output devices (e.g. a display, speaker and the like, not shown). Such input and output devices serve to receive commands for controlling the operation of the host device 104 and for presenting information, e.g. to a user of the host device 104. The host device 104 also includes, as noted in connection with FIG. 1, the tracking devices 120-1 and 120-2 connected to the processor 200 for providing positional data to the processor 200.

The host device 104 further includes a wireless communications assembly 212 interconnected with the processor 200. The communications assembly 212 enables the host device 104 to communicate with other computing devices, including the client device 108. In the present example, as noted above, the assembly 212 enables such communication according to the IEEE 802.11ad standard, and thus transmits and receives data at frequencies of around 60 GHz.

The communications assembly 212 includes a controller 216 in the form of one or more integrated circuits, configured to establish and maintain communications links with other devices. The controller 216 is also configured to process outgoing data for transmission via the above-mentioned transceivers 128-1, 128-2, 128-3 and 128-4. As will now be apparent, each transceiver 128 includes a transceiver circuit (e.g. an integrated circuit or any other suitable hardware element) connected to a steerable antenna array (e.g. a phased array of antenna elements). The controller 216 is further configured to receive transmissions from the transceivers 128 and process the transmissions for communication to the processor 200. The controller 216, in the present example, includes a baseband processor, which may be implemented as one or more integrated circuits preprogrammed to perform the functions discussed herein, or having stored thereon executable instructions that configured to controller 216 to perform those functions.

The client device 108 includes a central processing unit (CPU), also referred to as a processor 250. The processor 250 is interconnected with a non-transitory computer readable storage medium, such as a memory 254, having stored thereon various computer readable instructions for execution by the processor 250 to configure the client device 108 to perform various functions (e.g. receiving and rendering multimedia data from the host device 104). The memory 250 includes a suitable combination of volatile (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The client device 108 may also include one or more input devices 256 (e.g. an eye-tracking device, microphone or the like), and one or more output devices 258 (e.g. a display, speaker or the like). The input devices 256 serve to receive commands for controlling the operation of the client device 108, as well as commands for relaying to the host device 104 to control certain aspects of the operation of the host device 104. The output devices 258 serve to present information, including the multimedia data received from the host device 104, to the operator 112.

The client device 108 further includes a wireless communications assembly 262 interconnected with the processor 250. The communications assembly 262 enables the client device 108 to communicate with other computing devices, including the host device 104. In the present example, as noted above, the assembly 262 enables such communication according to the IEEE 802.11ad standard, and thus transmits and receives data at frequencies of around 60 GHz.

The communications assembly 262 includes a controller 266 in the form of one or more integrated circuits, configured to establish and maintain communications links with other devices. The controller 266 is also configured to process outgoing data for transmission via the above-mentioned transceivers 124-1, 124-2, 124-3 and 124-4. As will now be apparent, each transceiver 124 includes a transceiver circuit (e.g. an integrated circuit or any other suitable hardware element) connected to a steerable antenna array (e.g. a phased array of antenna elements). The controller 266 is further configured to receive transmissions from the transceivers 124 and process the transmissions for communication to the processor 250. The controller 266, in the present example, includes a baseband processor, which may be implemented as one or more integrated circuits preprogrammed to perform the functions discussed herein, or having stored thereon executable instructions that configured to controller 266 to perform those functions.

Figure 3:
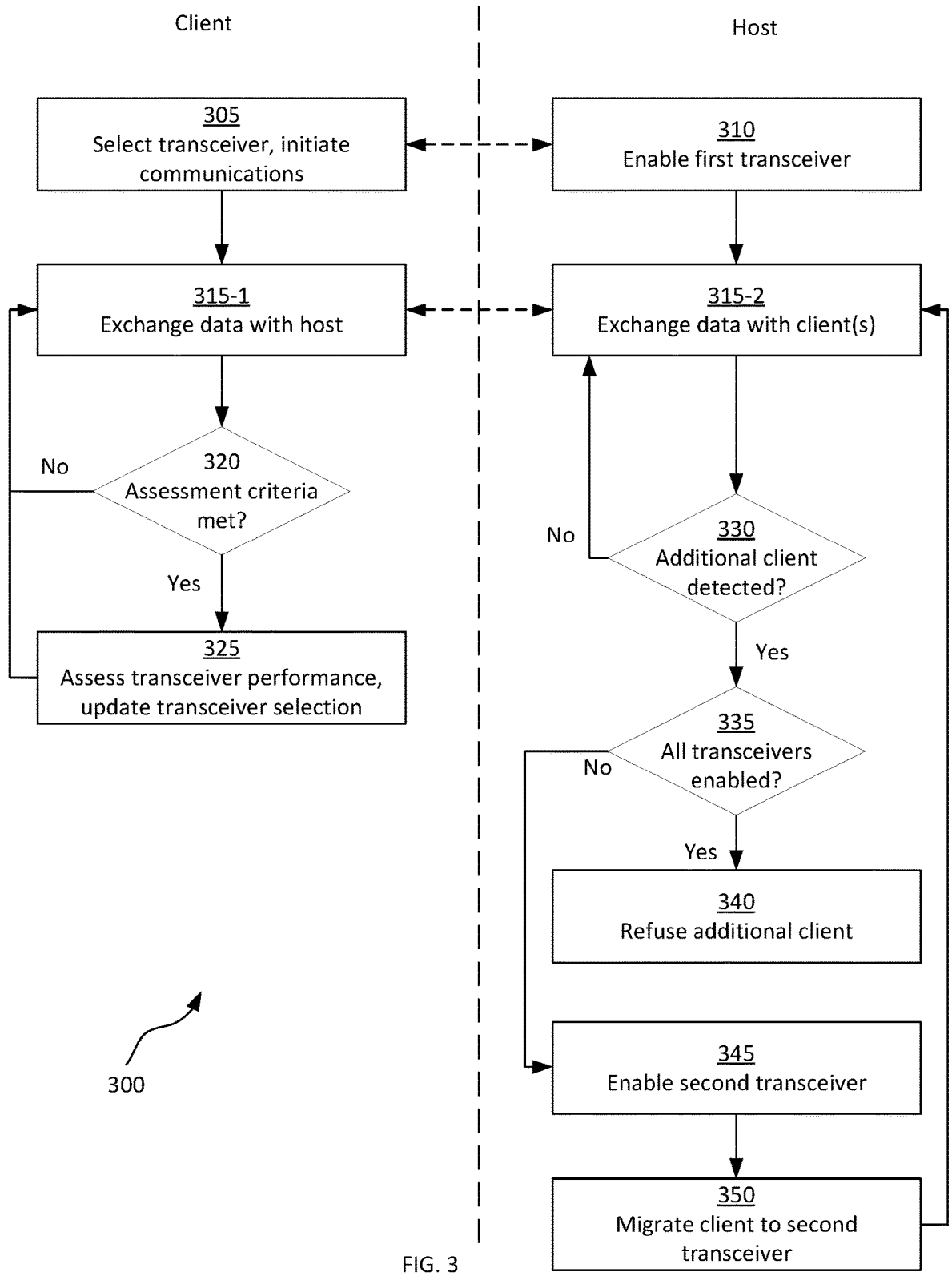
FIG. 3 depicts a method of wireless exchange of multimedia data.

Turning now to FIG. 3, the operation of the devices 104 and 108, and particularly of the controllers 216 and 266, will be described in greater detail. FIG. 3 illustrates a method 300 of wireless exchange of multimedia data. The method 300 will be described in conjunction with its performance on the system 100. As indicated in FIG. 3, certain blocks of the method 300 are performed by the client device 108, while other blocks are performed by the host device 104.

At block 305, the client device 108, and more specifically the controller 266, is configured to select one of the transceivers 124 and to initiate communications with the host device 104 via the selected one of the transceivers 124. The selection at block 305 may be the selection of a preconfigured default transceiver 124, or may be based on an assessment of the performance of each of the transceivers 124, as discussed in greater detail below.

At block 310, the host device 104 is configured to enable a first one of the transceivers 128 (e.g. a preconfigured default transceiver). The enablement of the transceiver 128 can be performed in response to a request to initiate communications generated by the client device 108 at block 305 and sent to the host device 104. For example, the transceivers 128 of the host device 104 may be placed in a low-power mode until such a request is detected, at which point the controller 216 may be configured to enable (i.e. switch to a fully operational mode) one of the transceivers 128. In other examples, however, the performance of block 310 precedes the performance of block 305. For example, the host device 104 can be configured to maintain a transceiver in an enabled state in order to periodically broadcast an identifier (e.g. an SSID) of the host device 104 or a local-area network hosted by the host device 104. The client device 108 initiates communications at block 305 by enabling a transceiver 124 and sending a request including the above-mentioned identifier (as well as an identifier of the client device 108 itself).

Figure 4:
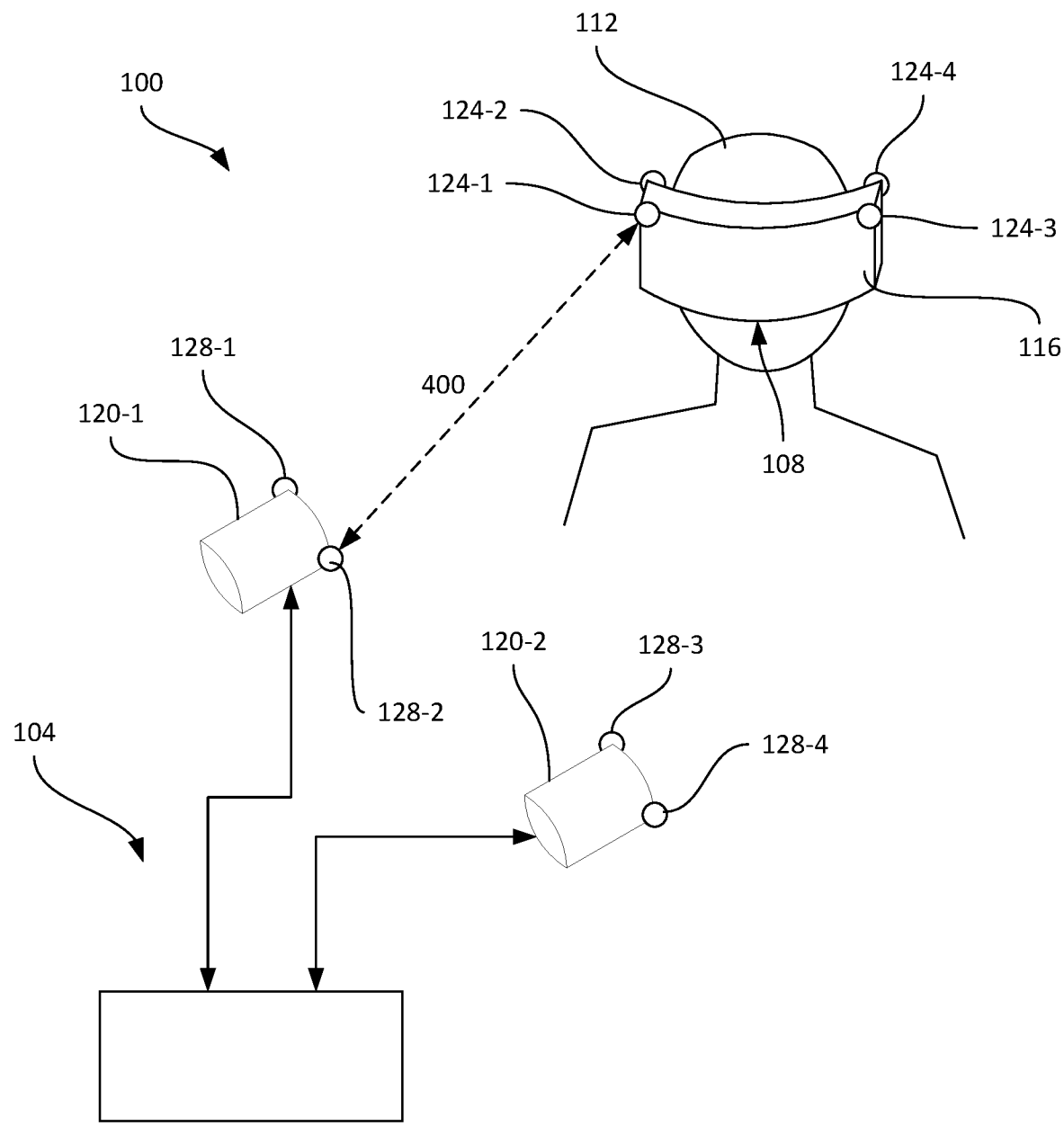
FIGS. 4-7 depict the system 100 at various stages of the performance of the method of FIG. 3.

In general, therefore, via the performance of blocks 305 and 310, the client device 108 and the host device 108 are configured to establish a wireless connection with each other. Referring briefly to FIG. 4, a connection 400 is shown having been established between the host device 104 and the client device 108. In particular, the connection 400 is established between the transceiver 128-2 of the host device 104 and the transceiver 124-1 of the client device 108. As will be apparent, the establishment of the connection can also include a suitable beamforming procedure when the antennas deployed with the transceivers 124 and 128 are steerable arrays.

Returning to FIG. 3, at blocks 315-1 and 315-2, the client device 108 and the host device 104 are configured to exchange data over the connection 400. In the present example, as noted above, the host device 104 is configured to generate VR multimedia data for presentation to the operator 112 by the client device 108. The exchange of data at blocks 315 includes, therefore, the receipt of positioning data at the processor 200 from the tracking devices 120. The host device 104 may also receive additional positioning data (e.g. eye tracking data) from the client device 108 itself. Based on the positioning data, the host device 104 is configured to generate multimedia data and transmit the multimedia data to the client device 108, which is configured to present the multimedia data to the operator 112 via the output device 258.

At block 320, the client device 108 is configured to determine whether one or more transceiver assessment criteria have been met. When the transceiver assessment criteria have been met, the client device 108 proceeds to block 325, at which the performance of each transceiver 124 is assessed, as will be discussed below in further detail. When the transceiver assessment criteria have not been met, however, the performance of the method 300 returns to block 315, at which the client device 108 continues to exchange data with the host device 104 using the previously selected transceiver 124 (in the present example performance of the method 300, the transceiver 124-1 selected at block 305).

The client device 108, in other words, is configured to periodically assess transceiver performance, and the period between such assessments are determined by the transceiver assessment criteria. Various transceiver assessment criteria are contemplated, and the criteria examined by the controller 266 in the determination at block 320 include any one or, of any suitable combination of, those criteria. For example, the criteria can include a time period (e.g. a preconfigured time period stored by the controller 266, such as five seconds). The criteria can also include a performance threshold for the currently active transceiver 124. For example, the controller 266 may be configured to continuously monitor one or more performance attributes of the transceiver 124 employed at block 315. When a performance attribute falls below a preconfigured threshold, the determination at block 320 is affirmative. Examples of the performance attributes include a received signal strength indicator (RSSI) and a signal-to-noise ratio (SNR) generated from signals received at the active transceiver 124 from the host device 104.

When the determination at block 320 is affirmative, at block 325 the controller 266 is configured to switch each of the transceivers 124 from the above-mentioned low-power state to an enabled, or active, state. The controller 266 is then configured, for each transceiver 124 (that is, for each of the previously inactive transceivers as well as the active transceiver selected to exchange data at block 315), to assess the performance of the transceiver 124. The assessment of performance for a given transceiver includes a measurement of one or more performance attributes by the controller 266, such as the above-mentioned RSSI and SNR. The performance attributes can be measured based on transmissions received from the host device 104 and addressed to the active transceiver 124 (i.e. containing the multimedia data). In other examples, the performance attributes can be measured by transmitting, via each transceiver 124, a request to the host device 104 and receiving feedback from the host device 104 (i.e. from the transceiver 128-2 in the present example performance of the method 300) indicating the RSSI and/or SNR detected at the host device 104 based on the request.

The controller 266 is configured to complete the performance of block 325 by updating the transceiver selection originally made at block 305 based on the performance assessment discussed above. For example, the controller 266 can be configured to select the transceiver for which the highest performance attribute or combination of attributes were measured. In some examples, the controller 266 is also configured to apply a minimum threshold to at least one of the performance attributes. That is, for example, the controller 266 may be configured to select the transceiver, from a set of the transceivers 124 having an SNR that exceeds a preconfigured minimum, having the greatest RSSI.

Following the update of the transceiver selection, the controller 266 is configured to return to block 315-1 to continue the exchange of data with the host device 104, using the updated transceiver selection from block 325. The unselected transceivers 124 are set to a low-power state in some examples. As will now be apparent, in some examples the updated selection at block 325 may result in the selection of the same transceiver 124 as was selected at block 305.

Figure 5:
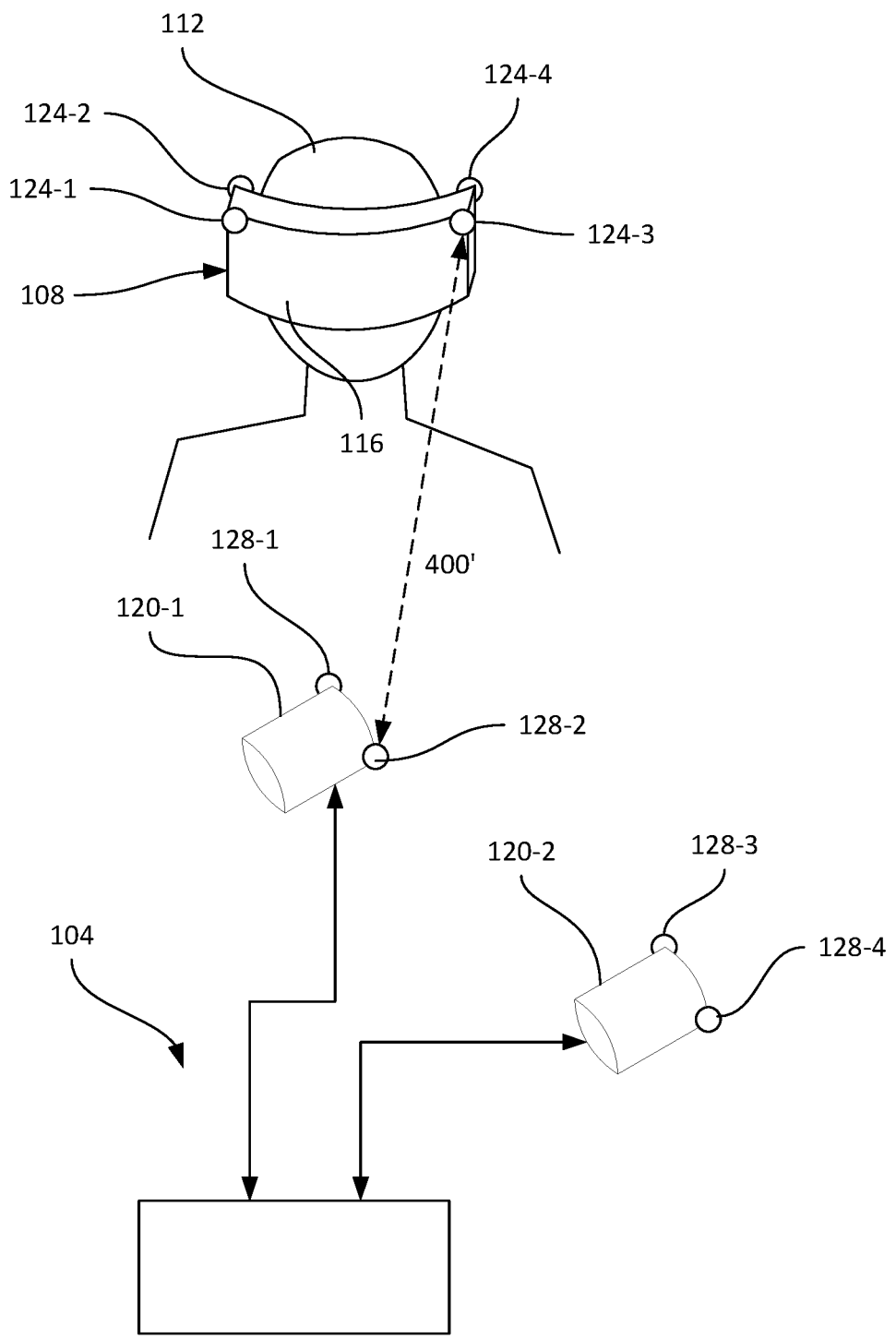

Turning to FIG. 5, the system 100 is shown following a performance of blocks 320 and 325 by the client device 108. In particular, as a result of the movement of the operator 112 relative to the host device 104, the performance assessment conducted by the controller 266 resulted in the selection of the transceiver 124-3 rather than the transceiver 124-1. The connection 400 between the client device 108 and the host device 104 is therefore migrated, at the client device 108, to the transceiver 124-3. The connection 400 is thus illustrated as an updated connection 400' in FIG. 5. As will be apparent to those skilled in the art, the client device 108 and the host device 104 may update certain parameters defining the connection 400'. For example, a beamforming protocol may be performed, and the host device 104 may update connection parameters stored at the controller 216 to include an identifier of the transceiver 124-3 rather than the transceiver 124-1.

As will now be apparent, the host device 104 (and more specifically, the controller 216) can also be configured to perform a determination of whether assessment criteria have been met, and an assessment of the performance of each transceiver 128 as well as an updated selection of which transceiver 128 with which to implement the connection 400. The assessment of performance and updated transceiver selection at the host device 104 is performed independently of blocks 320 and 325 at the client device 108.

The host device 104 is also configured to control the transceivers 128 based on a detected number of client devices 108 in the system 100. Returning to FIG. 3, at block 330, the host device 104 is configured to determine whether an additional client device 108 has been detected. The determination at block 330 need not be linked temporally to the performance of blocks 320 and 325 by the client device 108 (that is, the determination at block 330 may be performed before, after, or both before and after blocks 320 and 325 are performed by the client device 108).

Figure 6:
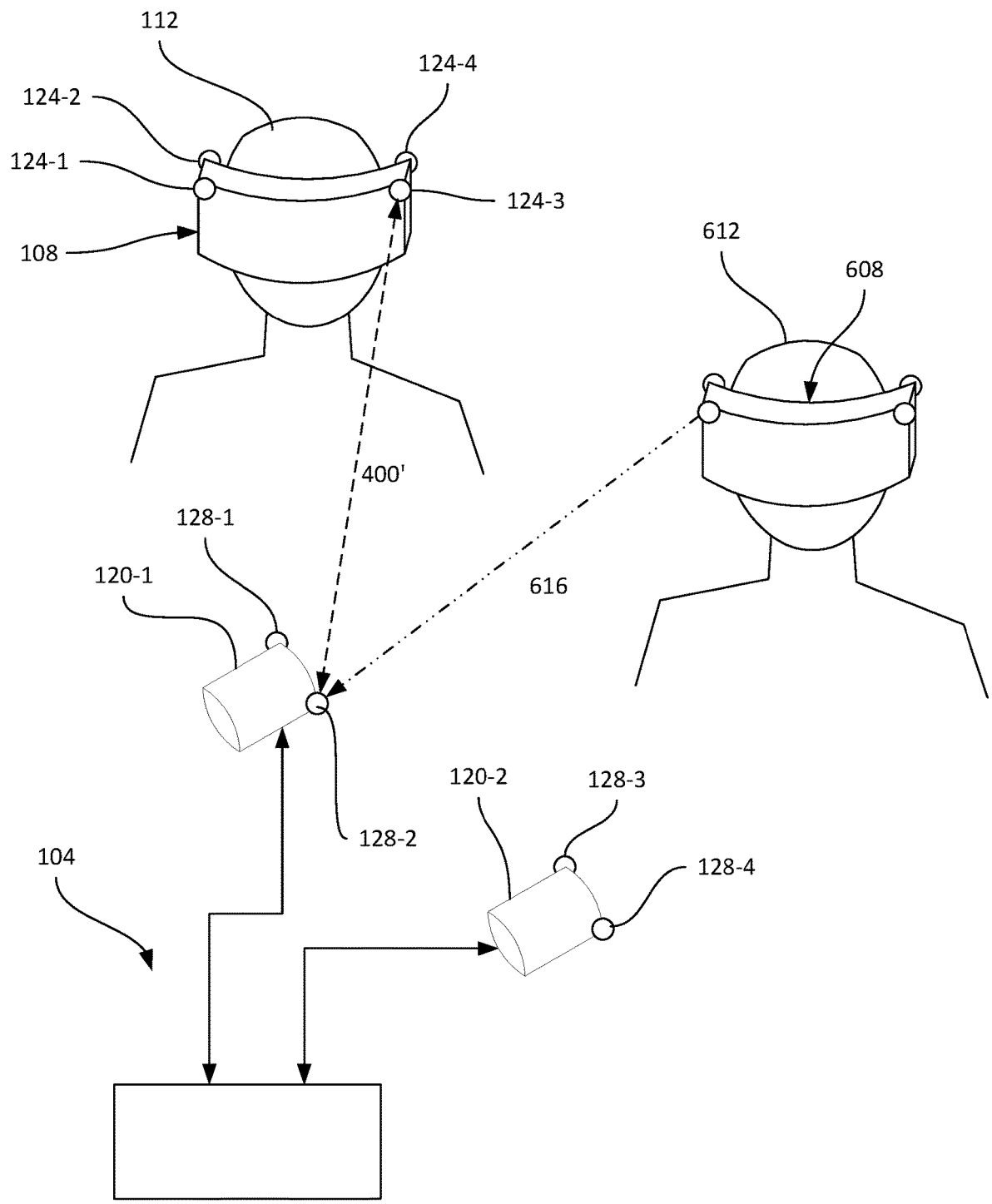

Throughout the performance of the method 300, the host device 104 may be configured to monitor signals received at the transceiver 128-2 (or any other active transceiver 128) for requests from other client devices to initiate communications with the host device 104. When no such requests are detected, the determination at block 330 is negative, and performance of the method 300 returns to block 315-2. Referring to FIG. 6, a further client device 608 (e.g. worn by a further operator 612) is shown transmitting a request 616 to the host device 104, which is detected at the transceiver 128-2. The determination at block 330 is therefore affirmative, and performance of the method 300 proceeds to block 335.

At block 335, the controller 216 is configured to determine whether all of the transceivers 128 are enabled (i.e. in an active state). As discussed earlier, the host device 104 is configured to place any transceivers 128 not enabled at block 310 in a low-power state. As will be apparent, however, additional client devices result in the enablement of additional transceivers 128. When no further transceivers 128 remain in the low-power state, the determination at block 335 is affirmative, and at block 340 the controller 216 is configured to refuse the additional client request. In other examples, at block 340 the controller 216 may be configured to initiate further beamforming refinement with the client device 108 and assessing the performance of the connection 400 prior to refusing the additional client device.

Figure 7:
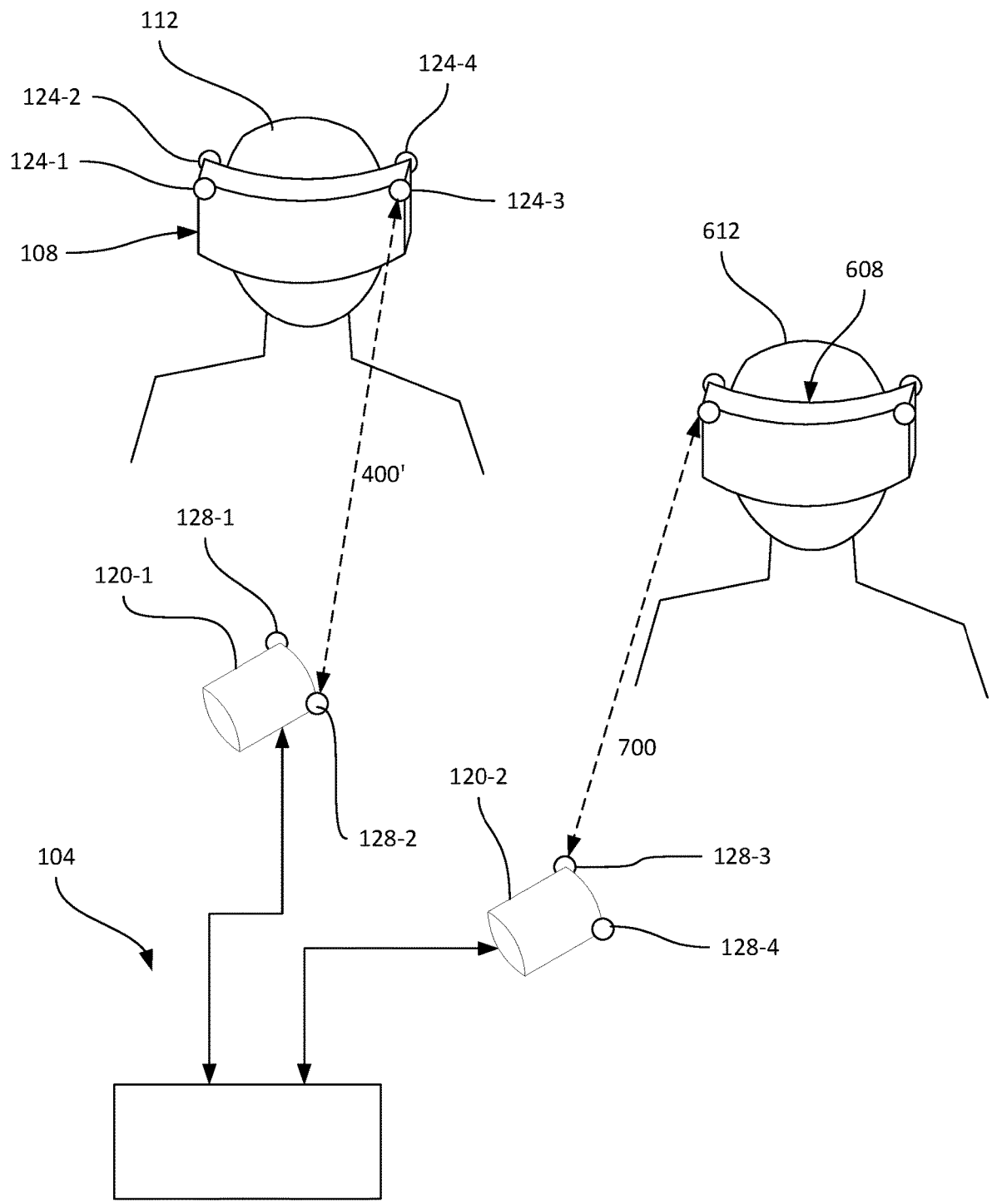

When the determination at block 335 is negative, however—as in the example shown in FIG. 6, in which three of the transceivers 128 remain in a low-power state—the controller 216 proceeds to block 345, at which a second (or subsequent, if multiple client devices are already connected to the host device 104) transceiver 128 is enabled. At block 350, the additional client device 608 is migrated to the second transceiver and data exchange continues with both client devices 108 and 608 at block 315-2. Referring to FIG. 7, the transceiver 128-3 has been enabled, and communications between the host device 104 and the client device 608 have been migrated to the newly enabled transceiver 128-3.

The scope of the claims should not be limited by the embodiments set forth in the above examples, but should be given the broadest interpretation consistent with the description as a whole.

The invention claimed is:

1. A system, comprising:
   (a) host computing device including:
      (i) a host wireless transceiver, and
      (ii) a processor configured to generate multimedia data for transmission via the host wireless transceiver to a movably-mounted client device; and
   (b) the movably-mounted client device including:
      (i) a single housing,
      (ii) a display supported by the single housing, for presenting the multimedia data;
      (iii) a first set of wireless transceivers supported by the single housing, and
      (iv) a controller supported by the single housing, the controller connected to the display and each of the wireless transceivers, the controller configured to:
         assess respective wireless link conditions for respective wireless links between the host computing device and each of the first set of wireless transceivers, and
         based on the wireless link conditions, select one of the wireless transceivers from the first set of wireless transceivers to receive the multimedia data from the host computing device.

2. The system of claim 1, the controller further configured to periodically repeat (i) the assessment of the wireless link conditions, and (ii) the selection of a transceiver based on the wireless link conditions.

3. The system of claim 1, the controller further configured, following the selection of the one of the wireless transceivers, to place the remaining wireless transceivers in the first set of wireless transceivers in a low-power state.

4. The system of claim 1, wherein the wireless transceivers are spaced apart on the housing.

5. The system of claim 1, the host computing device further comprising:
a second set of wireless transceivers; and
a host controller connected to each of the second set of wireless transceivers, the host controller configured to:
enable a first one of the second set of wireless transceivers for transmitting the multimedia data to the client device; and
place the remaining transceivers of the second set in a low-power state.

6. The system of claim 5, the host controller further configured to:
detect a request for further multimedia data from a further client device; and
responsive to the detection, enable a second one of the second set of wireless transceivers for transmitting the further multimedia data to the further client device.

7. The system of claim 1, the host computing device further comprising a tracking device configured to generate positional data for the client device; wherein the host wireless transceiver is mounted on the tracking device.

8. A method, comprising:
at a host computing device including a host wireless transceiver and a processor, generating multimedia data for transmission via the wireless transceiver;
at a movably-mounted client device including (i) a single housing, (ii) a display supported by the single housing for presenting the multimedia data, (iii) a first set of wireless transceivers supported by the single housing, and (iv) a controller supported by the single housing and connected to the output device and each of the wireless transceivers:
assessing respective wireless link conditions for respective wireless links between the host computing device and each of the first set of wireless transceivers; and
based on the wireless link conditions, selecting one of the wireless transceivers from the first set of wireless transceivers to receive the multimedia data from the host computing device.

9. The method of claim 8, further comprising, at the controller; periodically repeating (i) the assessment of the wireless link conditions, and (ii) the selection of a transceiver based on the wireless link conditions.

10. The method of claim 8, further comprising, at the controller, following the selection of the one of the wireless transceiver: placing the remaining transceivers in the first set of wireless transceivers in a low-power state.

11. The method of claim 8, further comprising, at a host controller connected to a second set of wireless transceivers of the host computing device:
enabling a first one of the second set of wireless transceivers for transmitting the multimedia data to the client device; and
placing the remaining transceivers of the second set in a low-power state.

12. The method of claim 11, further comprising, at the host controller:
detecting a request for further multimedia data from a further client device; and
responsive to the detection, enabling a second one of the second set of wireless transceivers for transmitting the further multimedia data to the further client device.

13. The system of claim 1, wherein the wireless link condition for each wireless link includes at least one of a received signal strength indicator (RSSI) and a signal-to-noise (SNR) ratio.

* * * * *